UNITED STATES PATENT OFFICE.

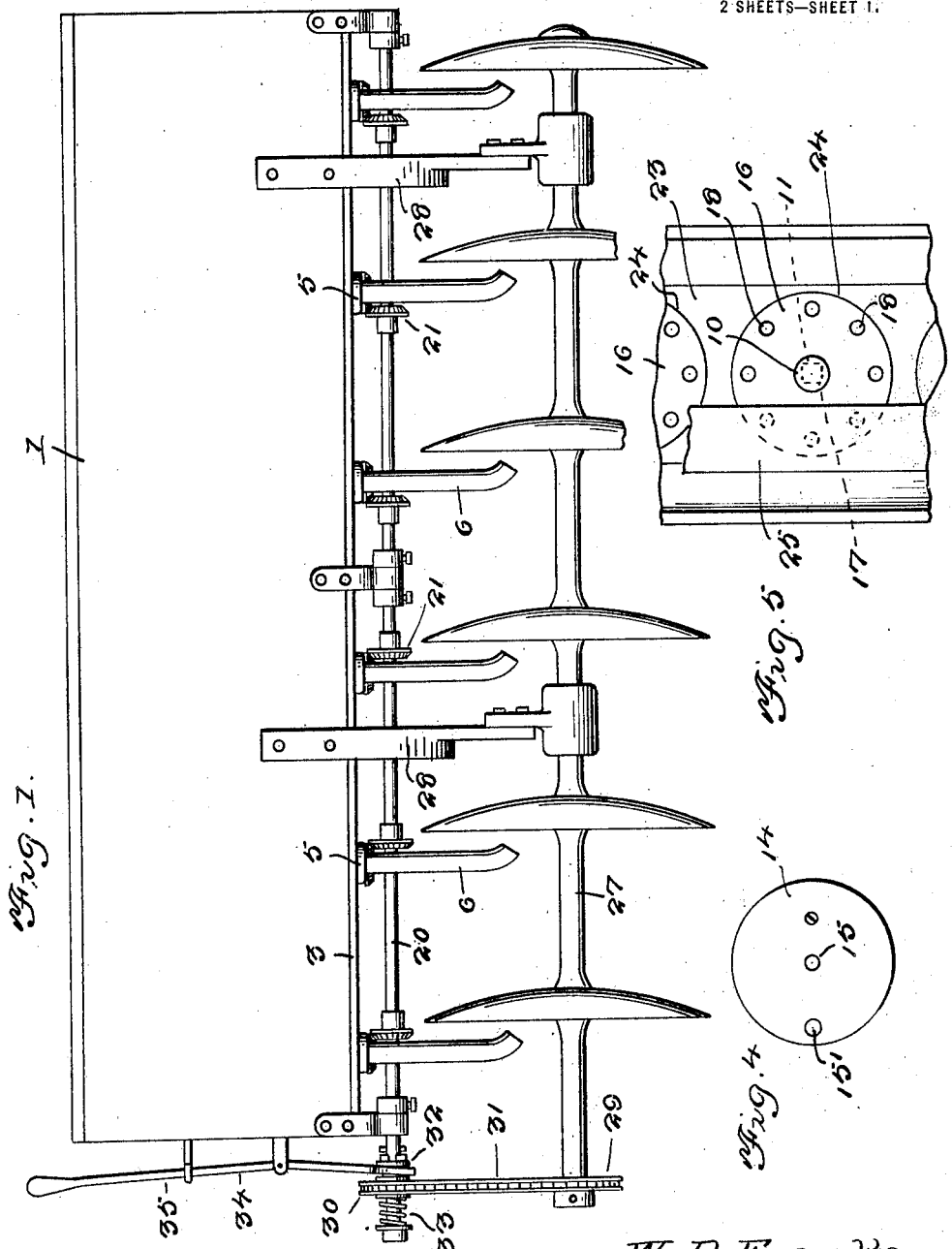

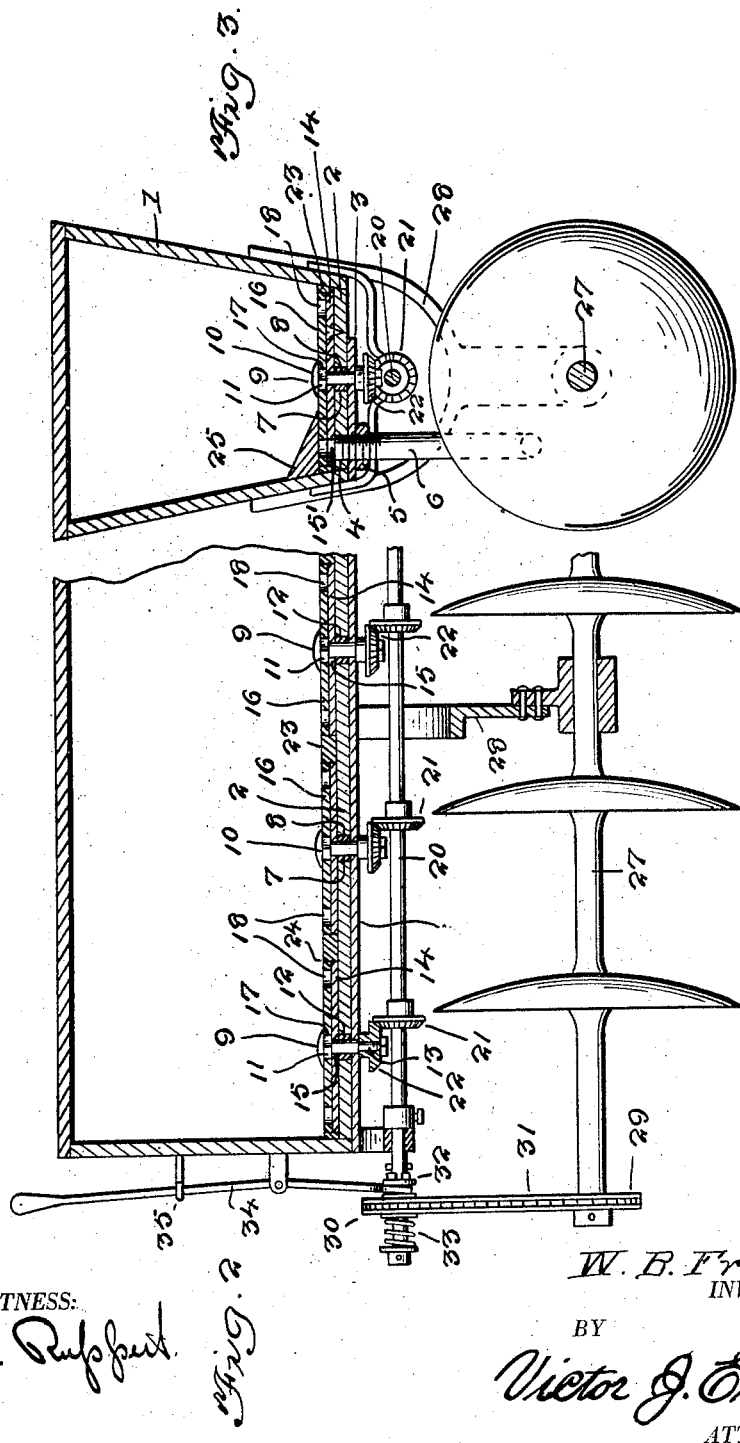

WILLIAM B. FRANKS, OF TOLU, KENTUCKY, ASSIGNOR OF ONE-HALF TO G. W. WINDERS, OF TOLU, KENTUCKY.

GRAIN-DRILL.

1,382,497.  Specification of Letters Patent.  Patented June 21, 1921.

Application filed August 26, 1919. Serial No. 319,971.

*To all whom it may concern:*

Be it known that I, WILLIAM B. FRANKS, a citizen of the United States, residing at Tolu, in the county of Crittenden and State of Kentucky, have invented new and useful Improvements in Grain-Drills, of which the following is a specification.

This invention relates to an improvement in grain drills in the use of which grain may be regularly and uniformly delivered for turning in by the disk of the harrow on which the grain drill is mounted.

The improved grain drill comprises a receptacle for receiving the grain in bulk, in the bottom of which are arranged a series of wear plates each formed with a single opening arranged above the grain spout. Overlying the wear plates are reduced plates formed with a series of openings near the periphery of a size to receive a single or a predetermined number of seed. The reduced plates are rotated and deliver the seed contained in these openings to and through the opening of the wear plate as said wear plate opening registers with the openings in the reduced plates, and the seed fall through the spout for delivery.

In the drawings:—

Figure 1 is a view in elevation of the improved grain drill.

Fig. 2 is a longitudinal central section through the same.

Fig. 3 is a transverse section of the same.

Fig. 4 is a plan view of one of the wear plates.

Fig. 5 is a plan view of one of the seed plates.

In the drawings the improved grain drill comprises a seed box 1 having a bottom 2, preferably reinforced by metallic strips 3, whereby to strengthen the bottom. The bottom is formed with openings 4, and on the lower side of such bottom and surrounding the openings are projections 5, shaped to receive the upper ends of grain spouts 6. Arranged in the bottom and one side of the openings 4 and preferably in transverse alinement therewith is a series of openings 7 adapted to receive bearings 8, in which are rotatably mounted bolts 9. The upper portions of said bolts are headed as at 10, and immediately below said headed portion are of non-circular form in transverse section as at 11. Below the portions 11 the shafts 9 are circular as at 12, those portions of the rod shaft projecting below the bottom being further reduced at 13. Disks 14 hereinafter called wear disks are mounted in the bottom, one on each of the rod shafts 9, these disks being fixed to the bottom in an appropriate manner, and the rounded portions 12 of the shafts 9 passed through the central opening 15 adapted when the disk is in position to overlie the discharge opening 4 formed in the bottom. Seed disks 16 are also mounted upon the respective rod shafts 9, each disk being preferably formed with a non-circular opening 17 adapted to fit the non-circular upper portion of the shaft 9, whereby the seed disk and shaft 9 are fixed against independent rotation. The seed disks are formed adjacent their peripheries with a series of seed receiving openings 18 and as the disks 16 are adapted for rotation, these openings 18 are arranged to successively pass above the openings 15 in the wear disks 14, so that the disks 4 operate to form a bottom for the openings 18 until the openings 15 are reached whereupon the seed in the openings 18 will be discharged through said openings 15 to the openings 4 into the spout 6. Rotatably supported below the grain box 1 as by hangers 19 is a shaft 20, on which is arranged a series of double pinions 21. These pinions are arranged adjacent to the lower reduced end 13 of the shafts 9, and on said reduced ends are mounted coöperating pinions 22, whereby as the shaft 20 is rotated all of the seed disks will be correspondingly rotated, as will be apparent.

A false bottom 23 is secured within the grain box and to the bottom thereof, said bottom 23 being formed with a series of openings 24, of a size corresponding to that of the disks 14 and 16, the false bottom being of a thickness equal to the combined thickness of both disks 14 and 16. A cut off 25 is secured to one side of the grain box so as to overlie and project beyond the discharge openings 15 of the wear disks 14, thereby working backward the seed which may be moved on the top of the feed disk and preventing any such seed reaching the discharge openings 15, except those carried in the openings 18, as the latter are successively presented to the openings 15.

The grain box is designed for mounting upon the usual disk harrow the shaft of which indicated at 27 is adapted to support the grain box through the medium of U- shaped uprights 28, secured to said shaft 27 with their arms secured to the opposing side walls of the grain box as shown in Fig. 1 of the drawings. The shaft 20 is operated from the shaft 27 the latter being terminally provided with a sprocket wheel 29 for this purpose. Arranged upon the shaft 20 and loose thereon is a sprocket wheel 30, connected with the sprocket 29 by a chain 31. The sprocket wheel 30 is adapted to be connected to the shaft 20 through the medium of a clutch 32 which clutch is held in such relation to the shaft 20 through the medium of a spring 33. A lever 34 is mounted on the end of the grain box and connected to the clutch so that in operation of said lever, the clutch may be actuated to release the connections between the shaft 20 and sprocket 30, thereby stopping the movement of the feed disk and preventing the delivery of the seed. A catch 35 is preferably provided on the grain box, by which the lever 34 may be held in operative position, that is in position to hold the parts against operation.

What I claim is:—

A grain drill embodying a grain box, grain spouts leading from the bottom thereof, a false bottom secured within the grain box and having a plurality of spaced openings therein to provide seats, wear disks located within the seats and having openings arranged above the grain spouts, seed disks also located within the seats above the wear disks, a shaft arranged externally of the box, means connecting the shaft and seed disks, said means extending through the wear plates and bottom and seed disks and means for operating the shaft to actuate the seed disks.

In testimony whereof I affix my signature.

WILLIAM B. FRANKS.